US011881664B2

(12) United States Patent
Belisle et al.

(10) Patent No.: US 11,881,664 B2
(45) Date of Patent: Jan. 23, 2024

(54) POWER FEEDER CONNECTOR DEVICES

(71) Applicant: Hamilton Sundstrand Corporation, Charlotte, NC (US)

(72) Inventors: Francis C. Belisle, Roscoe, IL (US); Gary L. Miles, Stillman Valley, IL (US); Robert C. Cooney, Janesville, WI (US); Debabrata Pal, Hoffman Estates, IL (US); Mark Hamilton Severson, Rockford, IL (US); Nhia Yang, Loves Park, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 349 days.

(21) Appl. No.: 17/127,468

(22) Filed: Dec. 18, 2020

(65) Prior Publication Data

US 2022/0200219 A1 Jun. 23, 2022

(51) Int. Cl.
*H01R 9/22* (2006.01)
*H01R 9/24* (2006.01)
(Continued)

(52) U.S. Cl.
CPC ........... *H01R 25/145* (2013.01); *H01R 9/223* (2013.01); *H01R 9/24* (2013.01); *H01R 13/447* (2013.01)

(58) Field of Classification Search
CPC ........ H01R 25/145; H01R 9/223; H01R 9/24; H01R 13/447; H01R 4/34; H01R 13/53; H01R 2201/26
See application file for complete search history.

(56) References Cited

U.S. PATENT DOCUMENTS 4,410,226 A * 10/1983 Adduci .................... H02G 3/10 439/34
5,876,224 A * 3/1999 Chadbourne ........ H01R 25/142 439/121
(Continued)

FOREIGN PATENT DOCUMENTS

CH 711634 A2 4/2017
DE 2260324 A1 6/1974
(Continued)

OTHER PUBLICATIONS

Extended European Search Report issued, of the European Patent Office, dated May 27, 2022, in corresponding European Patent Application No. 21215642.6.

*Primary Examiner* — Michael C Zarroli
(74) *Attorney, Agent, or Firm* — Locke Lord LLP; Daniel J. Fiorello; Gabrielle L. Gelozin

(57) ABSTRACT

A power feeder device can include a base having a mounting portion and a plurality of connector structures extending from the mounting portion and spaced apart relative to each other to form a respective gap therebetween. Each connector structure can be configured to receive a respective pair of terminals to electrically connect the respective pair of terminals within connector structures and to block a line of sight between an adjacent pair of terminals. The device can also include a cover configured to mate with the base to enclose each of the plurality of connector structures and to increase a length of a creepage path between each pair of terminals by at least partially inserting into each gap between the connector structures. The base and the cover can be configured to form a terminal opening on each lateral side when assembled to allow pass-through of a conductor and/or portion of each terminal.

18 Claims, 5 Drawing Sheets

(51) Int. Cl.
*H01R 25/14* (2006.01)
*H01R 13/447* (2006.01)

(56) References Cited

U.S. PATENT DOCUMENTS

| | | | | |
|---|---|---|---|---|
| 7,670,153 | B2 | 3/2010 | Kulig | |
| 9,153,893 | B2 | 10/2015 | Yamada et al. | |
| 9,509,068 | B2 | 11/2016 | Hansen | |
| 10,153,629 | B2 | 12/2018 | Greenwood | |
| 10,158,184 | B2 | 12/2018 | Boisnier et al. | |
| 10,164,357 | B2 | 12/2018 | Wang et al. | |
| 10,483,665 | B2 | 11/2019 | Ishihara et al. | |
| 10,554,094 | B2 | 2/2020 | Hochstetler et al. | |
| 10,673,190 | B2 | 6/2020 | Baker | |
| 10,770,850 | B2 | 9/2020 | Gellert et al. | |
| 2003/0003811 | A1 * | 1/2003 | Chadbourne | H01R 9/223 439/718 |
| 2016/0233592 | A1 * | 8/2016 | Hansen | H01R 9/226 |
| 2019/0168694 | A1 * | 6/2019 | Kato | H01R 4/70 |

FOREIGN PATENT DOCUMENTS

| | | | | |
|---|---|---|---|---|
| EP | 3509196 | A1 | 7/2019 | |
| JP | 2008017693 | A | 1/2008 | |
| WO | WO-0195437 | A1 * | 12/2001 | H01R 13/6215 |

* cited by examiner

POWER FEEDER CONNECTOR DEVICES

FIELD

This disclosure relates to electrical power feeder systems.

BACKGROUND

The standard for electrical connections of high amperage power feeders has the electrical power connection by a single threaded fastener. New aerospace electrical power levels being higher and wire feeders being larger, a single fastener will not be sufficient for electrical conduction and support in high vibration environments. Typically the electrical connections have a simple dielectric cover over the electrical joints primarily for protection from accidental physical contact.

Such conventional methods and systems have generally been considered satisfactory for their intended purpose. However, there is still a need in the art for improved power feeder connector devices. The present disclosure provides a solution for this need.

SUMMARY

A power feeder device can include a base having a mounting portion and a plurality of connector structures extending from the mounting portion and spaced apart relative to each other to form a respective gap therebetween. Each connector structure can be configured to receive a respective pair of terminals to electrically connect the respective pair of terminals within connector structures and to block a line of sight between an adjacent pair of terminals. The device can also include a cover configured to mate with the base to enclose each of the plurality of connector structures and to increase a length of a creepage path between each pair of terminals by at least partially inserting into each gap between the connector structures. The base and the cover can be configured to form a terminal opening on each lateral side when assembled to allow pass-through of a conductor and/or portion of each terminal.

Each of the plurality of connector structures can include first and second barrier walls extending from the mounting portion and axially spaced apart to block a line of sight to an adjacent connector structure. Each of the plurality of connector structures can include first and second lateral walls extending from the mounting portion and laterally spaced apart.

Each of the first and second lateral walls can connect respective first and second barrier walls. In certain embodiments, each lateral wall can extend only partially the height of each barrier wall.

Each lateral wall defines a cutout shape that forms a portion of a respective terminal opening. For example, the cutout shape can be semi-circular (e.g., such that the terminal opening is circular).

Each of the plurality of connector structures can define a base plate pocket between the barrier walls and the lateral walls. Each plate pocket can be configured to receive a respective base plate for a respective pair of terminals to mount to. The base plate pocket can be defined laterally inward from the lateral walls and separated from the lateral walls by a separator portion.

In certain embodiments, a base plate can be disposed in each base plate pocket. The base plate can include a plurality of threaded holes for receiving a fastener to electrically connect and retain a respective pair of terminals. In certain embodiments, the base can be made of an electrical insulator and the base plate can be made of an electrical conductor.

The cover can define a top surface and a plurality of insert walls extending from the top surface configured to insert into and fill the gap between adjacent connector structures. The cover can define first and second side walls extending from the top surface and configured to fit between a respective pair of barrier walls and to abut respective first and second lateral walls to seat on the lateral walls to enclose the connector structure at lateral ends thereof around a conductor and/or portion of each terminal. The first and second side walls can define an opening shape configured to partially form the terminal opening. The cover can be configured to position the opening shape and the cutout shape to complement each other to form the terminal opening when the cover is installed on the base.

The top surface can contact a top of the barrier walls and extends across the connector structure in the axial direction to enclose the connector structure at a top thereof. An electrically insulating seal can be disposed at least partially in the terminal opening to seal around a conductor and/or portion of each terminal.

In certain embodiments, the plurality of connector structures can include three connector structures for a three phase electrical system. Any other suitable number is contemplated herein (e.g., two).

The base can include a plurality of mounting holes defined through the mounting portion for mounting to a structure. In certain embodiments, the base can include a plurality of cover mounting holes for receiving a fastener to attach the cover. At least some of the cover mounting holes are axially located in each gap between each the connector structures.

In accordance with at least one aspect of this disclosure, an aircraft electrical system can include a plurality of pairs of terminals connected together, e.g., within about an inch of each other, using any suitable device disclosed herein, e.g., any suitable embodiment as described above. In certain embodiments, the terminals can be high voltage terminals above 235 volts AC or above 270 volts DC (e.g., about 1000 VDC to about 3000 VDC).

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
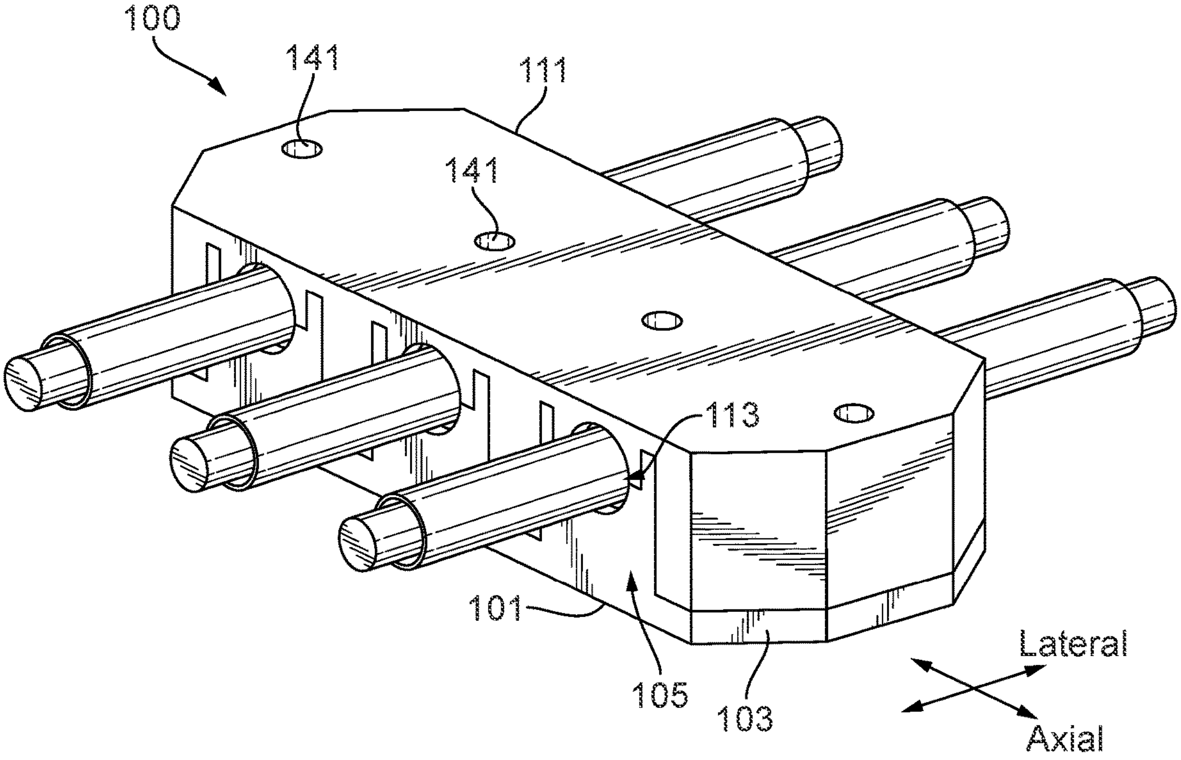
FIG. 1 is a perspective view of an embodiment of a device in accordance with this disclosure, shown having terminals connected together therein and extending from the device.
Figure 2:
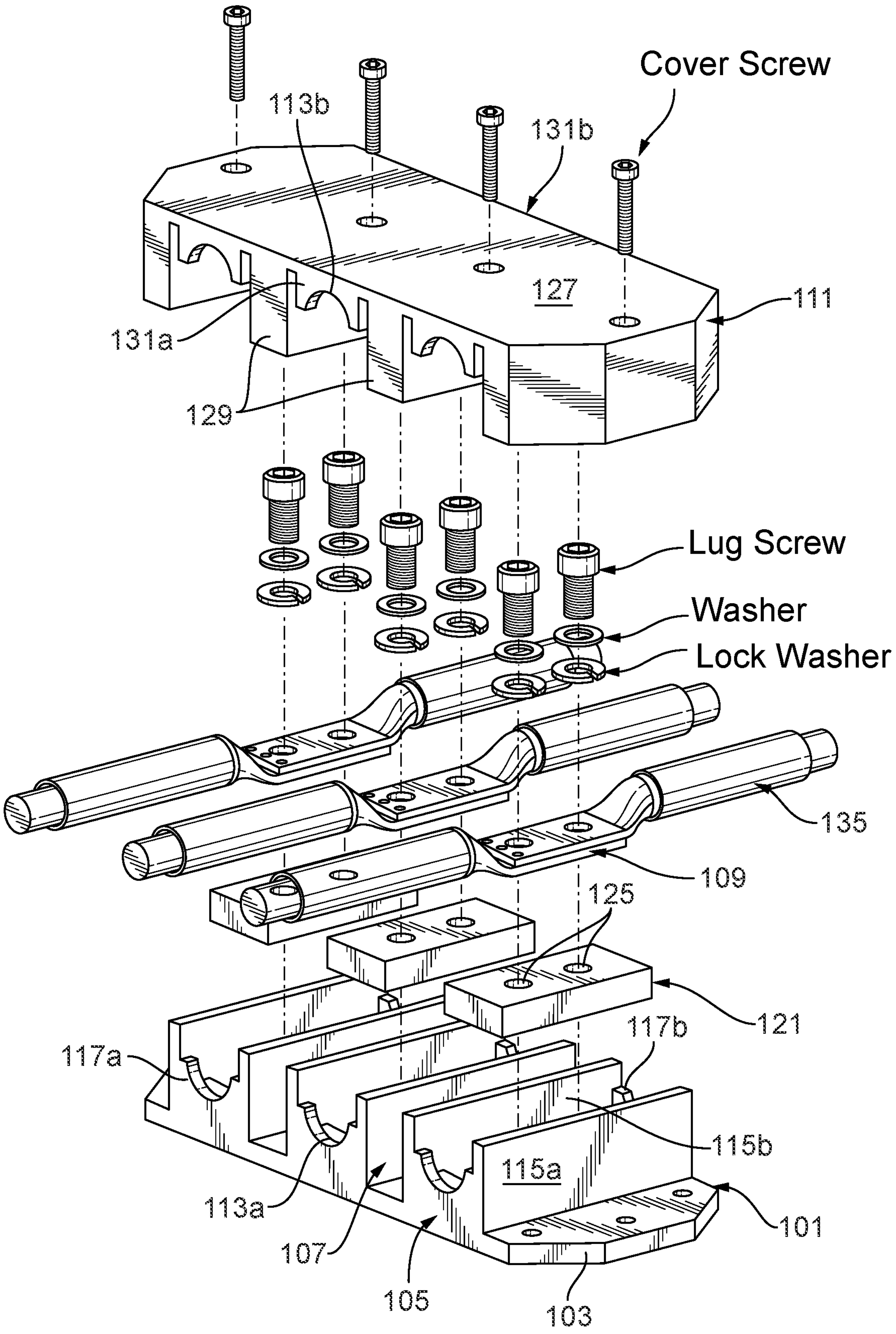
FIG. 2 is an exploded view of the embodiment of FIG. 1.

Reference will now be made to the drawings wherein like reference numerals identify similar structural features or aspects of the subject disclosure. For purposes of explanation and illustration, and not limitation, an illustrative view of an embodiment of a device in accordance with the disclosure is shown in FIG. 1 and is designated generally by reference character 100. Other embodiments and/or aspects of this disclosure are shown in FIGS. 2-6. Certain embodiments described herein can be used to interconnect high voltage terminals, e.g., for aerospace applications. Any other suitable use and/or advantage is contemplated herein.

Referring generally to FIGS. 1-6, a power feeder device 100 can include a base 101 having a mounting portion 103 and a plurality of connector structures 105 extending from the mounting portion 103 and spaced apart relative to each other to form a respective gap 107 therebetween. Each connector structure 105 can be configured to receive a respective pair of terminals 109 to electrically connect the respective pair of terminals within connector structures and to block a line of sight between an adjacent pair of terminals 109.

Figure 5:
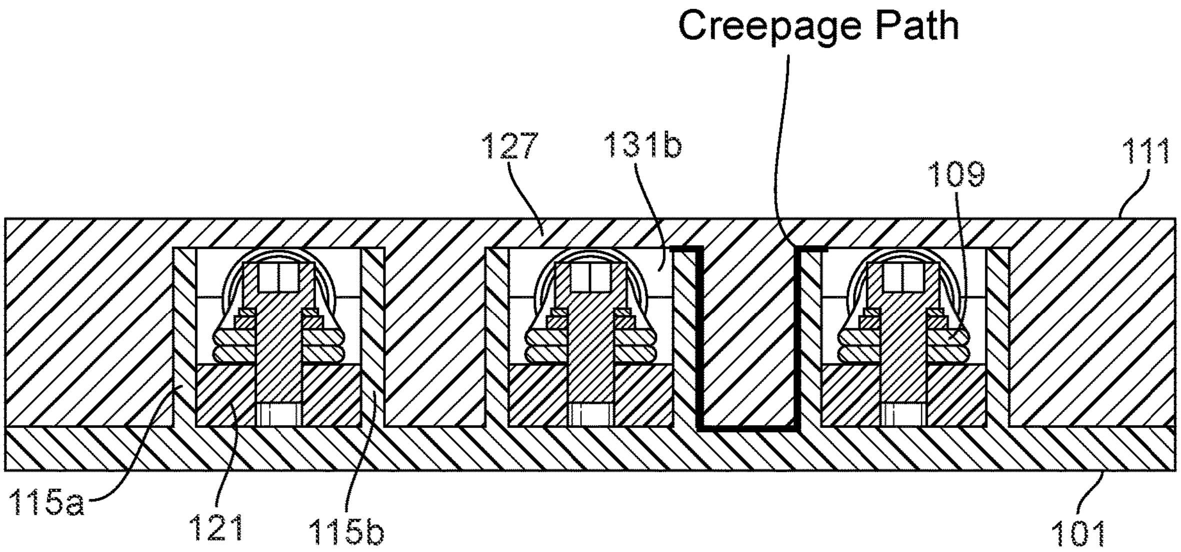
FIG. 5 is a cross-sectional view of the embodiment of FIG. 1 taken along an axial axis.

The device 100 can also include a cover 111 configured to mate with the base 101 to enclose each of the plurality of connector structures 105 and to increase a length of a creepage path (e.g., as shown in FIG. 5) between each pair of terminals 109 by at least partially inserting into each gap 107 between the connector structures 105. The base 101 and the cover 111 can be configured to form a terminal opening 113 on each lateral side when assembled to allow pass-through of a conductor (e.g., a wire or rod) and/or portion of each terminal 119.

Each of the plurality of connector structures 105 can include first and second barrier walls 115*a*, 115*b* extending (e.g., vertically) from the mounting portion 103 and axially spaced apart to block a line of sight to an adjacent connector structure 105 (e.g., as shown). Each of the plurality of connector structures 105 can include first and second lateral walls 117*a*, 117*b* extending (e.g., vertically) from the mounting portion 103 and laterally spaced apart (e.g., at the edges of base 103 as shown).

Each of the first and second lateral walls 117*a*, 117*b* can connect respective first and second barrier walls 115*a*, 115*b*. In certain embodiments, each lateral wall 117*a*, 117*b* can extend only partially the height of each barrier wall 115*a*, 115*b* (e.g., as shown).

Each lateral wall 117*a*, 117*b* can define a cutout shape 113*a* that forms a portion of a respective terminal opening 113. For example, the cutout shape 113*a* can be semi-circular (e.g., such that the terminal opening 113 is circular as shown).

Figure 3:
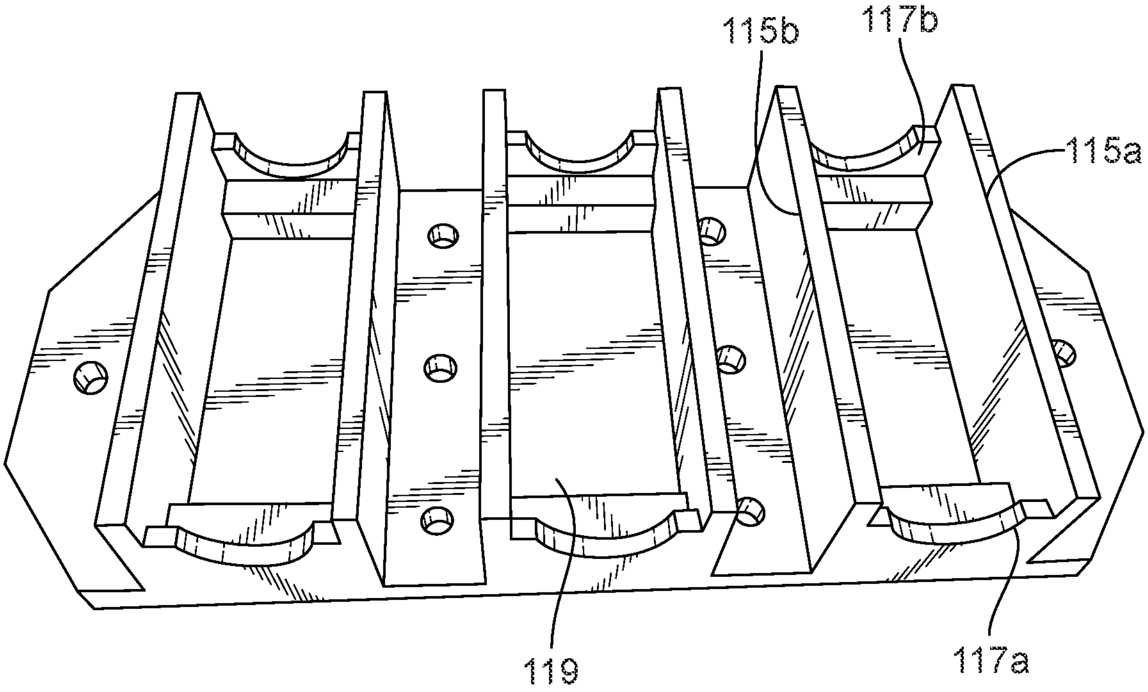
FIG. 3 is a perspective view of a base of the embodiment of FIG. 1.

As shown in FIG. 3, for example, each of the plurality of connector structures 105 can define a base plate pocket 119 between the barrier walls 115*a, b* and the lateral walls 117*a, b*. Each plate pocket 119 can be configured to receive a respective base plate 121 for a respective pair of terminals 109 to mount to. The base plate pocket 119 can be defined laterally inward from the lateral walls 117*a, b* (e.g., between the lateral walls 117*a, b* as shown) and separated from the lateral walls 117*a, b* by a separator portion 123*a, b*.

In certain embodiments, a base plate 121 can be disposed in each base plate pocket 119. The base plate 121 can include a plurality of threaded holes 125 (e.g., two as shown) for receiving a fastener (e.g., screws with washers as shown) to electrically connect and retain a respective pair of terminals 109. In certain embodiments, the base 101 can be made of an electrical insulator (e.g., strong rigid plastic) and the base plate 121 can be made of an electrical conductor (e.g., metal). In certain embodiments, the base plate 121 can be insulative.

The cover 111 can define a top surface 127 and a plurality of insert walls 129 extending from the top surface 127 configured to insert into and fill the gap 107 between adjacent connector structures 105. The cover 111 can define first and second side walls 131*a, b* extending from the top surface 127 and configured to fit between a respective pair of barrier walls 115*a,b* and to abut respective first and second lateral walls 117*a, b* to seat on the lateral walls 117*a, b* to enclose the connector structure 105 at lateral ends thereof around a conductor and/or portion of each terminal 109. The first and second side walls 131*a, b* can define an opening shape 113*b* configured to partially form the terminal opening 113. The cover 111 can be configured to position the opening shape 113*b* and the cutout shape 113*a* to complement each other to form the terminal opening 113 when the cover 111 is installed on the base 101, e.g., as shown in FIG. 1 and FIG. 5.

The top surface 127 can contact a top of the barrier walls 115*a, b* and can extend across the connector structure 105 in the axial direction to enclose the connector structure 105 at a top thereof. In certain embodiments, an electrically insulating seal (e.g., sleeve 135) can be disposed at least partially in the terminal opening 113 to seal around a conductor and/or portion of each terminal 109. Any other suitable seal is contemplated herein to seal any gaps between the conductor/terminal and the cover and/or base in the terminal opening 113, for example.

In certain embodiments, the plurality of connector structures 105 can include three connector structures 105 for a three phase electrical system (e.g., as shown). Any other suitable number is contemplated herein (e.g., two).

The base 101 can include a plurality of mounting holes 137 defined through the mounting portion 103 for mounting to a structure. In certain embodiments, the base 101 can include a plurality of cover mounting holes 139 for receiving a fastener (e.g., cover screws as shown) to attach the cover 111. At least some of the cover mounting holes 137 can be axially located in each gap 107 between each the connector structures 105. As shown, the cover 111 can include a one or more cover through holes 141 configured to align with the cover mounting holes 137 to allow a fastener to attach the cover 111 to the base 101.

The cover 111 and the base 101 can be made of any suitable materials. For example, the cover 111 and the base 101 can be made of a dielectric material. In certain embodiments, the cover 111 can be more flexible than the base 101.

Figure 4:
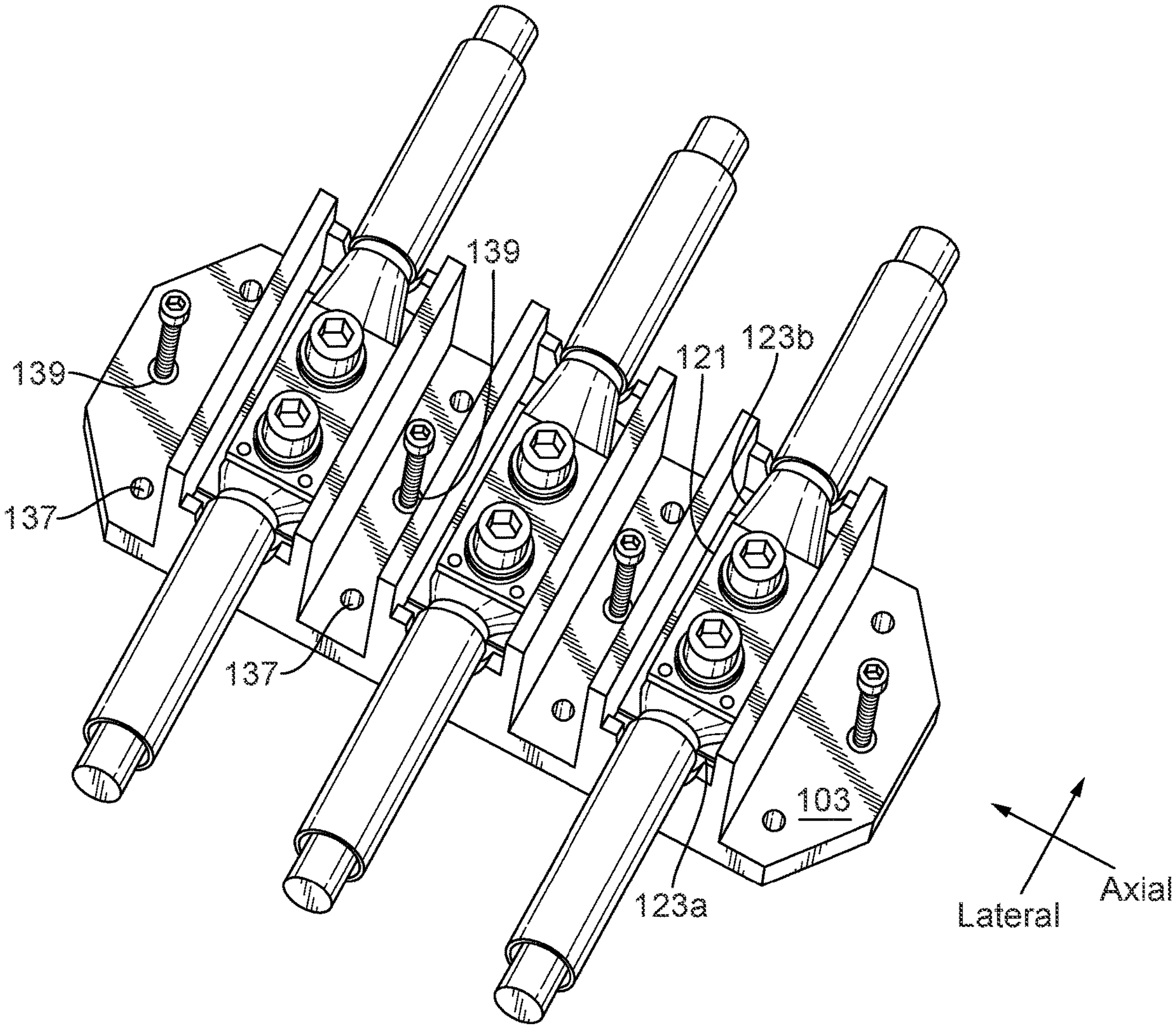
FIG. 4 is a perspective view of the base of FIG. 3, shown having terminal pairs fastened together to a base plate disposed in the base.
Figure 6:
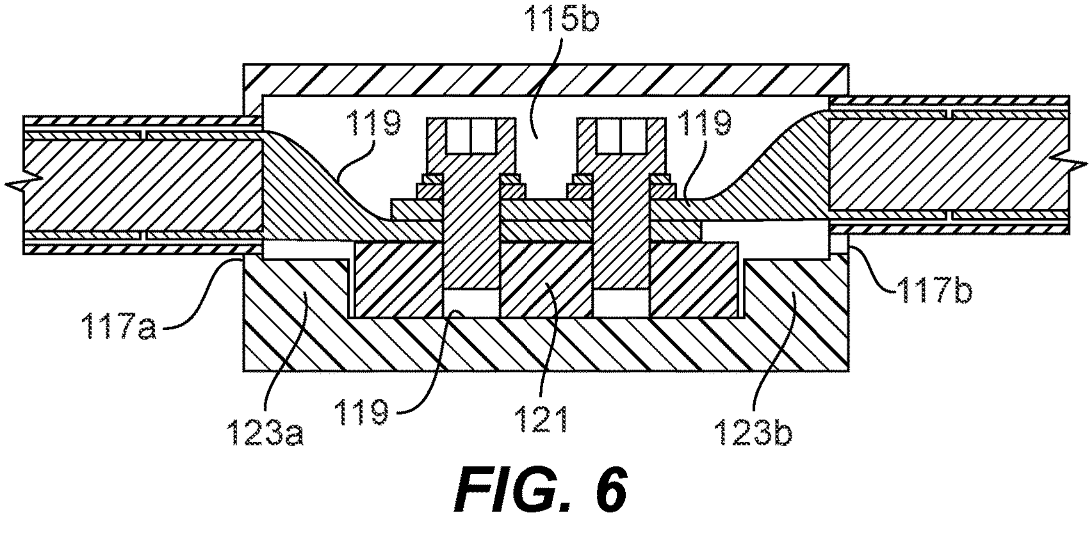
FIG. 6 is a cross-sectional view of the embodiment of FIG. 1, taken along a lateral line.

In accordance with at least one aspect of this disclosure, an aircraft electrical system can include a plurality of pairs of terminals connected together (e.g., as shown in FIGS. 4-6), e.g., within about an inch (e.g., about 1.5 inches in the axial direction) of each other, using any suitable device disclosed herein, e.g., any suitable embodiment as described above. In certain embodiments, the terminals 109 can be high voltage terminals above 235 volts AC or above 270 volts DC (e.g., about 1000 VDC to about 3000 VDC).

Embodiments may be configured to only allow the cover to be installed after correct electrical installation. In certain embodiments, the cover design can be compatible with single phase or multi-phase installations for example, with single bolts or multiple bolted joints. Certain embodiments can be a fixed electrical mechanical mounting with a captive fastener.

In certain embodiments, the terminal openings defined by the base and cover can have a gasket to provide protection and to seal the interface. A gasket seal can be split and be on both top and bottom covers (e.g., like a grommet) or be on the power feeder like a bushing, for example.

Embodiments can provide an elongated and or tortuous creepage path (e.g., the path of least resistance defined by the abutment of the cover and the base), e.g., as shown in FIG. 5, to prevent arcing even with extremely high voltages. Embodiments can prevent a line of sight between conductors/terminals.

The base can be configured to have good dielectric properties, good mechanical strength properties (e.g., a fiber reinforced material) for handling loads, high thermal conductivity for heat rejection to mounting and ambient heat transfer, and high temperature capabilities with about 200 C maximum allowable conductor temperatures. The cover can be configured to have good dielectric properties, moderate mechanical strength because it need not bear a load, moderate flexibility to clamp on feeders/terminal lugs at the terminal opening interface, and may have fins on the surface for improved heat transfer. Embodiments can include a threaded block integrated into the base in a pocket (e.g., glued therein).

Embodiments can include a bolted joint and feeder temperature monitoring for predictive health monitoring. Such temperature measurement devices (e.g. resistive detecting device (RTD) can be installed into the mounting cover as part of a molding or additive manufacturing process. The number of RTD type devices can be dependent on over all configuration as desired. RTD values from operation can be provided to the prognostic health monitoring (PHM) system inside airplane. PHM systems can utilize analytics to detect any impending failure associated with bolted joint. PHM system analytics can monitor temperature growth over a time period and, if the rate of growth is excessive will provide alert. Embodiments can include a small circular cover on the connector for interface I/O. Connector and device wiring can be molded in or part of additive processing or post molding process.

Certain embodiments can include 4/0 AWG copper feeders and 4/0 copper or copper alloy lugs with dual stud configuration, and ⅜" bolts for electrical clamping force and clamping force against vibration inducted loads from feeder. The complete clamped electrical power joints can be metallic. The base plate can be a steel nut plate with threads for bolts, for a robust high temperature electrical clamped joint. The fastener joint to the base plate can have a heavy spring washer for compensation of thermal extremes and thermal cycling. A Belleville-type washer can also be used as pre load device. Bolts can be used as the threaded fastener to have more options of higher strength fastener materials. With the cover installed, there can be no line of sight between conductors and fasteners. The cover and base integrated assembly can provide a labyrinth-type seal between power feeders and feeders to fasteners for very long creepage distances to prevent dielectric failure. The cover and base opening around lug barrel can have a soft grommet seal to provide a dust and liquid seal around each bolted power joint phase. There can be feeder insulation sleeving on lug barrel outside of dielectric enclosure for feeder to feeder line of sight protection and feeder to mounting conductor dielectric protection. The cover assembly can have captive fasteners for installing on to the base assembly to facility installation and mitigate Foreign Object Debris (FOD) risk.

In certain embodiments, the base plate can be non-magnetic for to prevent E-Field effects. The power feeder clamping bolts can be low or non-magnetic high strength material to prevent E-Field effects. In certain embodiments, the base plate can be knurled and epoxied into the housing, or knurled and molded in place. In certain embodiments, each terminal can be protected by cover slots fitting into barriers on all surfaces around the terminal.

In certain embodiments, a power feeder (wire or bus bar) electrical and mechanical connection system can have dual fasteners (threaded studs or bolts) construction, that provides both a high electrical amperage carrying connection (low voltage drop), mechanical strength for severe environment installations (vibration), aerospace high voltage robustness (protection to prevent voltage breakdown), and good thermal performance (minimize thermal losses). The electrical mechanical interface connection design can use double stud feeders for two (2) fasteners going thru the electrical power interfaces. The electrical mechanical interface design can improve electrical conduction to provide mechanical strength for greater resistance to mechanical loading or bending moments from large feeder into the bolted joint. The electrical mechanical interface design can improve thermal conduction for high amperage power level by minimizing voltage drop and heat sink capability of the mounting base.

The mounting base can be of higher thermal conductivity and be used to conduct heat to aircraft structure. In addition it can have cooling fins to increase natural convection from it to ambient for additional cooling. The electrical mechanical interface design can facilitate the electrical connection protection and insulation with integrated barriers and cover for high altitude and high voltage applications. The electrical mechanical interface design mounting base system can allow for the construction to provide for dielectric protection and high voltage in high altitude applications by creating long creepage (surface) distances between conductors and no line of sight between conductors for preventing contamination faults. The dielectric cover assembly can include grooves and barriers, which integrate into the mounting assembly to provide a dielectric enclosure and dust gasket type sealing around the electrical interface conductor(s). Integration of a temperature measurement device(s) can be done for predictive health monitoring of electrical joint performance/degradation. The material construction can be designed for arc resistant materials around the electrical conductors, and tough materials for mechanical strength at the alignment groves/flanges in the installation.

Embodiments can provide multiple fasteners for mechanical support of heavy electrical conductor interfaces against high dynamic loads, larger clamped areas of electrical conductors for high amperage, reduced thermal losses due to reduced voltage drop; increased area for conducting heat away from the electrical joint. Embodiments can provide protection for FOD fault failures, prevention of corona initiation to any metallic mounting surface, protection against creepage arc faults, protection against contamination.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A power feeder device, comprising:

a base, comprising:

a mounting portion; and a plurality of connector structures extending from the mounting portion and spaced apart relative to each other to form a respective gap therebetween, each connector structure configured to receive a respective pair of terminals to electrically connect the respective pair of terminals within connector structures and to block a line of sight between an adjacent pair of terminals; and a cover configured to mate with the base to enclose each of the plurality of connector structures and to increase a length of a creepage path between each pair of terminals by at least partially inserting into each gap between the connector structures, wherein the base and the cover are configured to form a terminal opening on each lateral side when assembled to allow pass-through of a conductor and/or portion of each terminal, wherein each of the plurality of connector structures includes first and second barrier walls extending from the mounting portion and axially spaced apart to block a line of sight to an adjacent connector structure, wherein each of the plurality of connector structures includes first and second lateral walls extending from the mounting portion and laterally spaced apart.

2. The device of claim 1, wherein each of the first and second lateral walls connect respective first and second barrier walls, and extend only partially the height of each barrier wall.

3. The device of claim 2, wherein each lateral wall defines a cutout shape that forms a portion of a respective terminal opening.

4. The device of claim 3, wherein the cutout shape is semi-circular.

5. The device of claim 3, wherein each of the plurality of connector structures defines a base plate pocket between the barrier walls and the lateral walls, wherein each plate pocket is configured to receive a respective base plate for a respective pair of terminals to mount to.

6. The device of claim 5, wherein the base plate pocket is defined laterally inward from the lateral walls and separated from the lateral walls by a separator portion.

7. The device of claim 5, further comprising a base plate disposed in each base plate pocket, wherein the base plate includes a plurality of threaded holes for receiving a fastener to electrically connect and retain a respective pair of terminals.

8. The device of claim 7, wherein the base is made of an electrical insulator, wherein the base plate is made of an electrical conductor.

9. The device of claim 3, wherein the cover defines a top surface and a plurality of insert walls extending from the top surface configured to insert into and fill the gap between adjacent connector structures.

10. The device of claim 9, wherein the cover defines first and second side walls extending from the top surface and configured to fit between a respective pair of barrier walls and to abut respective first and second lateral walls to seat on the lateral walls to enclose the connector structure at lateral ends thereof around a conductor and/or portion of each terminal.

11. The device of claim 9, wherein the first and second side walls define an opening shape configured to partially form the terminal opening, wherein the cover is configured to position the opening shape and the cutout shape to complement each other to form the terminal opening when the cover is installed on the base.

12. The device of claim 11, wherein the top surface contacts a top of the barrier walls and extends across the connector structure in the axial direction to enclose the connector structure at a top thereof.

13. The device of claim 12, further comprising an electrically insulating seal disposed at least partially in the terminal opening to seal around a conductor and/or portion of each terminal.

14. The device of claim 13, wherein the plurality of connector structures includes three connector structures for a three phase electrical system.

15. The device of claim 14, wherein the base includes a plurality of mounting holes defined through the mounting portion for mounting to a structure, wherein the base includes a plurality of cover mounting holes for receiving a fastener to attach the cover.

16. The device of claim 15, at least some of the cover mounting holes are axially located in each gap between each the connector structures.

17. An aircraft electrical system, comprising:

a plurality of pairs of terminals connected together within about an inch of each other using the device of claim 1.

18. The electrical system of claim 17, wherein the terminals are high voltage terminals above 235 volts AC or above 270 volts DC.

* * * * *